United States Patent
Ozerov et al.

(10) Patent No.: US 10,021,395 B2
(45) Date of Patent: Jul. 10, 2018

(54) METHODS AND APPARATUS FOR MODEL-BASED VISUAL DESCRIPTORS COMPRESSION

(71) Applicant: THOMSON LICENSING, Issy de Moulineaux (FR)

(72) Inventors: Alexey Ozerov, Rennes (FR); Jean-Ronan Vigouroux, Rennes (FR); Frederic Lefebvre, Rennes (FR)

(73) Assignee: Thomson Licensing (FR)

( * ) Notice: Subject to any disclaimer, the term of this patent is extended or adjusted under 35 U.S.C. 154(b) by 286 days.

(21) Appl. No.: 14/953,124

(22) Filed: Nov. 27, 2015

(65) Prior Publication Data
US 2016/0219277 A1    Jul. 28, 2016

(30) Foreign Application Priority Data

Nov. 27, 2014  (EP) ..................................... 14306910

(51) Int. Cl.
*G06K 9/46* (2006.01)
*H04N 19/136* (2014.01)
(Continued)

(52) U.S. Cl.
CPC ......... *H04N 19/136* (2014.11); *H04N 19/124* (2014.11); *H04N 19/184* (2014.11);
(Continued)

(58) Field of Classification Search
None
See application file for complete search history.

(56) References Cited

U.S. PATENT DOCUMENTS 7,620,818 B2 * 11/2009 Vetro ................... H04L 9/3231
                                                    382/115
8,175,376 B2   5/2012 Marchesotti et al.
(Continued)

FOREIGN PATENT DOCUMENTS

CN     101695000     4/2010
KR     20130140403   12/2013

OTHER PUBLICATIONS

Xin, "Compact Descriptors for Visual Search"; PhD Thesis in Electrical and Computer Engineering, Northwestern University, Jun. 2014, pp. 1-173.
(Continued)

*Primary Examiner* — Iman K Kholdebarin
(74) *Attorney, Agent, or Firm* — Jack Schwartz & Associates, PLLC (57) ABSTRACT

A particular implementation determines parameters of a generative probabilistic model from visual descriptors extracted from at least one image. The extracted visual descriptors are quantized and encoded using the model-based arithmetic encoding to be stored or for transmission to a decoder. The model parameters are also stored to be available to a decoder, or transmitted directly to a decoder. A decoder uses the stored, or received, model parameters to reconstruct the generative probabilistic model and then to decode the visual descriptors. The visual descriptors are used for image analysis tasks, such as image retrieval or object detection. A particular implementation uses a Gaussian mixture model as a generative probabilistic model.

14 Claims, 6 Drawing Sheets

(51) Int. Cl.
*H04N 19/94* (2014.01)
*H04N 19/124* (2014.01)
*H04N 19/184* (2014.01)
*H04N 19/44* (2014.01)
*H04N 19/50* (2014.01)
*H04N 19/91* (2014.01)

(52) U.S. Cl.
CPC ............ *H04N 19/44* (2014.11); *H04N 19/50* (2014.11); *H04N 19/91* (2014.11); *H04N 19/94* (2014.11)

(56) References Cited

U.S. PATENT DOCUMENTS

| | | |
|---|---|---|
| 8,290,253 B1 | 10/2012 | Wang et al. |
| 2004/0215447 A1* | 10/2004 | Sundareson ........ G10L 19/0208 704/200.1 |
| 2005/0131660 A1* | 6/2005 | Yadegar ................. G06T 9/001 703/2 |
| 2005/0188364 A1* | 8/2005 | Cockx ..................... G06F 8/456 717/159 |
| 2010/0158129 A1* | 6/2010 | Lai ....................... H04N 19/597 375/240.16 |
| 2012/0076401 A1 | 3/2012 | Sanchez et al. |
| 2012/0106791 A1* | 5/2012 | Lim .................. G06K 9/00771 382/103 |
| 2013/0226850 A1 | 8/2013 | Hannuksela et al. |
| 2015/0235073 A1* | 8/2015 | Hua .................. G06K 9/00288 382/118 |
| 2016/0119628 A1* | 4/2016 | Zepeda Salvatierra .......... H04N 19/172 382/243 |
| 2016/0371822 A1* | 12/2016 | Le Pendu ............ H04N 19/147 |

OTHER PUBLICATIONS

Takacs et al., "Outdoors augmented reality on mobile phone using loxel-based visual feature organization", 2008 Proceedings of the 1st ACM international conference on Multimedia information retrieval, Vancouver, British Columbia, Canada, Oct. 30, 2008, pp. 1-8.

McGuinness et al., "Efficient Storage and Decoding of SURF Feature Points", Advances in Multimedia Modeling, Jan. 2012, pp. 440-451.

Reynolds et al., "Speaker Verification Using Adapted Gaussian Mixture Models" Digital Signal Processing, vol. 10, No. 1-3 (2000), pp. 19-41.

Fevotte et al., "Nonnegative matrix factorization with the Itakura-Saito divergence: With application to music analysis", Neural computation, vol. 21, No. 3, 2009, pp. 793-830.

Marpe et al., "Context-Based Adaptive Binary Arithmetic Coding in the H. 26/AVC Video Compression Standard", IEEE Transactions on Circuits and Systems for Video Technology, vol. 13, No. 7, Jul. 2003, pp. 620-636.

Zhao et al., "On entropy-constrained vector quantization using Gaussian mixture models", IEEE Transactions on Communications, vol. 56, No. 12, Dec. 2008, pp. 2094-2104.

Tubaro et al., "Coding local and global binary visual features extracted from video sequences", Motion Picture Expert Group, ISO/IEC JTC1/SC29/WG11, Strasbourg France, Oct. 20, 2014, pp. 1-25.

* cited by examiner

METHODS AND APPARATUS FOR MODEL-BASED VISUAL DESCRIPTORS COMPRESSION

This application claims the benefit, under 35 U.S.C. § 119 of European Patent Application No. 14306910.2, filed Nov. 27, 2014.

TECHNICAL FIELD

The present principles relate generally to methods and apparatus for model-based visual descriptors compression for storage or transmission.

BACKGROUND

Visual descriptors are used in image or video analysis tasks to identify and describe keypoints in images for various purposes, such as image retrieval or object detection, for example. The keypoint descriptors and their coordinates are typically sent from an encoder to a decoder so that the decoder can easily perform these analysis tasks. However, their transmission or storage uses valuable bandwidth and therefore compression of these descriptors is needed.

SUMMARY

These and other drawbacks and disadvantages of the prior art are addressed by various described embodiments, which are directed to methods and apparatus for model-based visual descriptors compression for storage.

According to one general aspect, a method for visual descriptor compression is provided. The method comprises receiving visual descriptors extracted from at least one image. The method further comprises determining model parameters of a generative probabilistic model from the descriptors in the maximum likelihood sense. The method further comprises quantizing and encoding of the model parameters. The method further comprises quantizing the extracted visual descriptors and encoding them using the encoded model parameters by applying a model-based arithmetic encoding.

According to another general aspect, an apparatus comprises a receiver of visual descriptors extracted from at least one image. The apparatus further comprises a processor, configured to determine model parameters of a generative probabilistic model from the extracted visual descriptors in the maximum likelihood sense. The apparatus further comprises a quantizer for said model parameters and an encoder of the quantized model parameters. The apparatus further comprises a quantizer of the extracted visual descriptors and an encoder of the quantized visual descriptors using the model parameters by applying model based arithmetic encoding.

According to another general aspect, a method comprises receiving a bit stream comprising quantized generative probabilistic model parameters. The method further comprises reconstructing a generative probabilistic model using the quantized generative probabilistic model parameters. The method further comprises receiving a bit stream comprising encoded visual descriptors, and decoding the encoded visual descriptors using the reconstructed generative probabilistic model. The method further comprises performing an image analysis using the decoded visual descriptors.

According to another general aspect, an apparatus comprises a receiver of a bit stream comprising quantized generative probabilistic model parameters. The apparatus further comprises a processor to reconstruct a generative probabilistic model using the quantized generative probabilistic model parameters. The apparatus further comprises a receiver of a bit stream comprising encoded visual descriptors, and a processor to decode encoded visual descriptors using the reconstructed generative probabilistic model. The apparatus further comprises a processor to perform image analysis using the decoded visual descriptors.

The details of one or more implementations are set forth in the accompanying drawings and the description below. Even if described in one particular manner, it should be clear that implementations may be configured or embodied in various manners. For example, an implementation can be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

The present principles may be better understood in accordance with the following exemplary figures, in which.

DETAILED DESCRIPTION

The described embodiments are directed to methods and apparatus for model-based visual descriptor compression for storage or transmission. The compression methods described herein address lossy compression of visual descriptors, such as those found using the scale-invariant feature transform (SIFT) or speeded up robust features (SURF) methods, for example. The SIFT and SURF methods detect and describe the local features of an image or set of images. Such compression is helpful for reducing the memory requirements for these descriptors and their coordinates, or for reducing the bandwidth between an encoder and a decoder occupied by visual descriptors and coordinates during transmission. The described embodiments may also be very useful in a case when one does not know a priori which tasks these descriptors will be used for and with which aggregation, such as within a unified visual search standard, for example.

Many image or video analysis tasks, such as image retrieval or object detection, for example, are based on a series of steps.

First, visual descriptors must be extracted from an image. This is done by detecting interest points, or keypoints, in each image and computing a vector of descriptors for each detected point. Local descriptors can be detected using SIFT or SURF methods.

Next, the visual descriptors of an image or sub-image are aggregated into a very compact representation, such as a Bag of visual Words (BoW) or a Fisher vector. This represents a very lossy compression, so much of the descriptor and coordinate information is lost.

Finally, a task such as image retrieval or object detection, for example, is performed using the compact image representation.

There are few prior methods for visual descriptors compression.

A first prior art method mentions that visual descriptor compression is possible, but does not propose any practical method.

A second prior art approach gives a practical method that is simply based on scalar quantization of descriptors followed by descriptor-wise Huffman entropy encoding, applied independently to each descriptor. While efficient, this method does not lead to good rate-distortion performance, since it does not exploit in any efficient way the descriptors' redundancy. For example, vectors of descriptors extracted from one natural image are most likely to form groups of self-similar vectors because a natural image most likely contains many similar patches. However, this approach does not take this into account, since descriptor dimensions are encoded independently.

The approach described herein is a lossy compression scheme that efficiently exploits the redundancy of natural image descriptors. One embodiment of the approach is based on scalar uniform coefficients quantization, but the coefficient entropy encoding uses an arithmetic entropy coder based on local statistics derived from a probabilistic mode. This probabilistic model can be a Gaussian mixture model (GMM) or a probabilistic nonnegative matrix factorization (NMF). The probabilistic model can be globally pre-trained from a set of descriptor vectors corresponding to one or several images. This global probabilistic modeling allows the redundancy of descriptors within an image or a set of images to be exploited. This proposed arithmetic entropy coding can be viewed as a variant of context-based adaptive binary arithmetic coding (CABAC), where the context is very local, which leads to high efficiency. In this case, one can associate one context with one component of a GMM.

Figure 1:
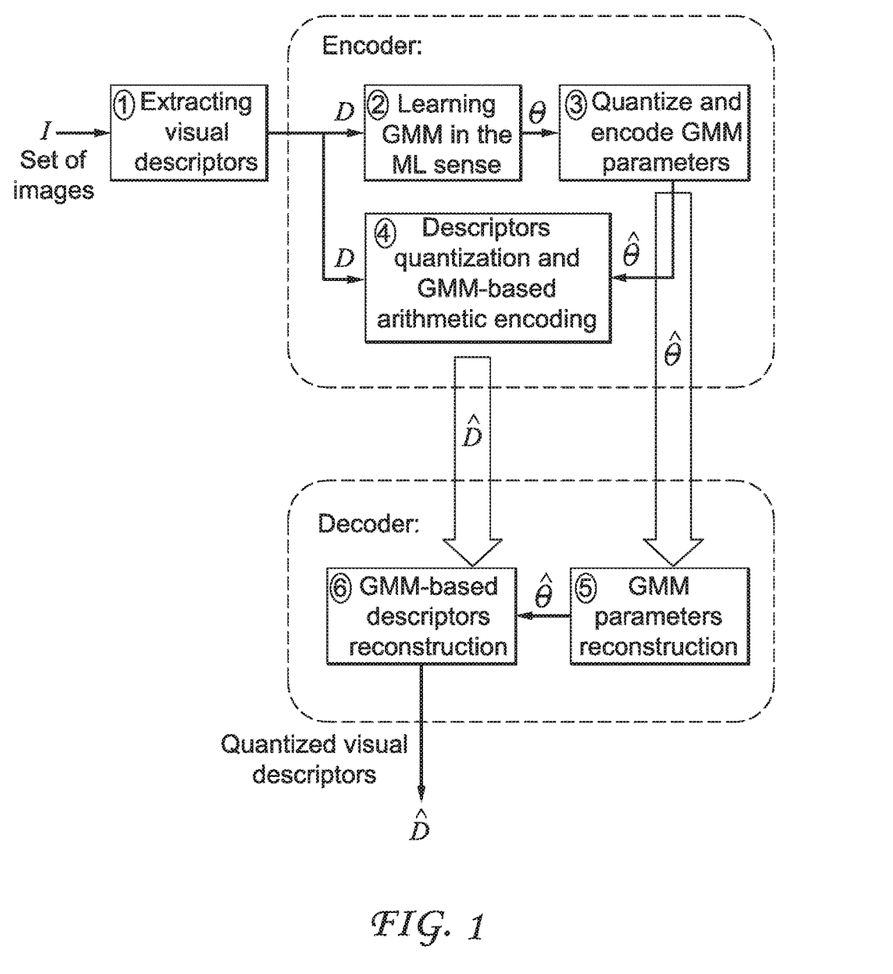
FIG. 1 shows one embodiment of an encoder and decoder using the present principles.

One embodiment utilizing the present principles is described and shown in FIG. 1. Assume there is a set of at least one image. The descriptors extracted from this set of images yield a set of vectors of dimension k. The extraction can be performed using SIFT or SURF, for example. Next, a generative probabilistic model that models descriptor density in the k-dimensional space is learned from the extracted descriptors in the maximum likelihood (ML) sense. For example, a GMM can be used as a generative probabilistic model. Estimating GMM parameters (I.e., learning GMM parameters) in the ML sense can be, for example, achieved by the expectation-maximization algorithm, which is one of the most popular algorithms for GMM parameter learning.

Next, the parameters of the generative probabilistic model are quantized and transmitted to a decoder, or stored. If, for example, a GMM is used, the GMM parameters can be uniformly quantized, for example, and their indices can be entropy encoded using Huffman coding.

The descriptors are then uniformly quantized and then encoded using a Gaussian mixture model-based arithmetic coding, which efficiently exploits the redundancy of natural image descriptors and achieves better compression.

Figure 2:
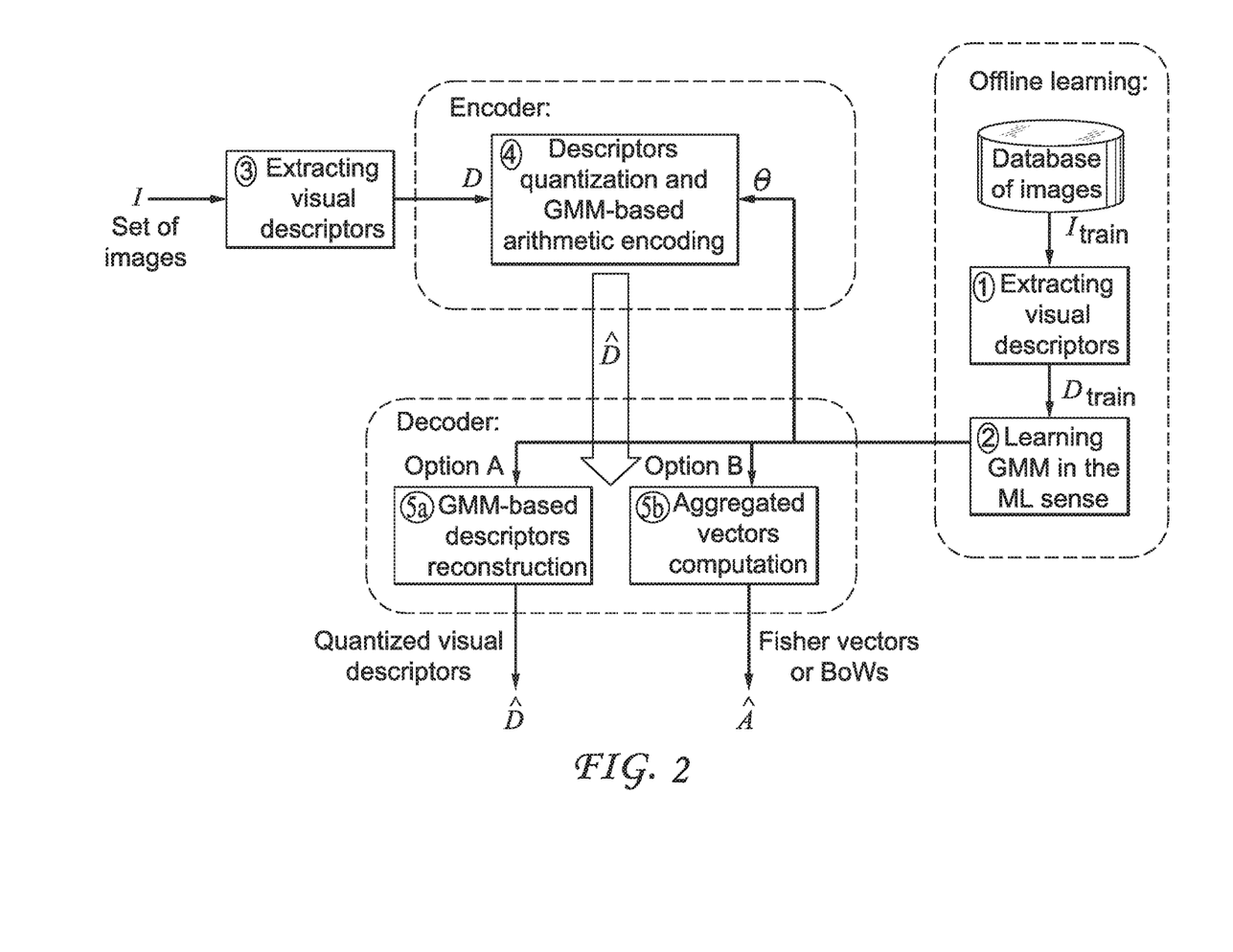
FIG. 2 shows another embodiment of an encoder and decoder using the present principles.

Another embodiment is shown in FIG. 2. The difference between this embodiment and the earlier described embodiments is that here, the GMM is now pre-trained from some large amount of other images, and it is assumed to be known by both the encoder and decoder. It is assumed that the model (the GMM) is known by both the encoder and decoder, not the set of training images. This is because the result of GMM training is usually not unique due to local maxima of the maximized likelihood function and arbitrary (usually random) initialization. An advantage of this approach is that one does not need to transmit the model any longer, which could lead to transmission rate savings. Another potential advantage is that the same GMM model can now be used, optionally, for both the raw descriptors compression and for aggregation to compute the BoWs or Fisher vectors. At the decoder, either the GMM-based descriptors reconstruction, the computation of aggregated Fisher vectors or BoWs, or both can be accomplished. This approach allows computation of the aggregation directly from a bitstream without decoding the descriptors, which can possibly be performed faster.

Figure 3:
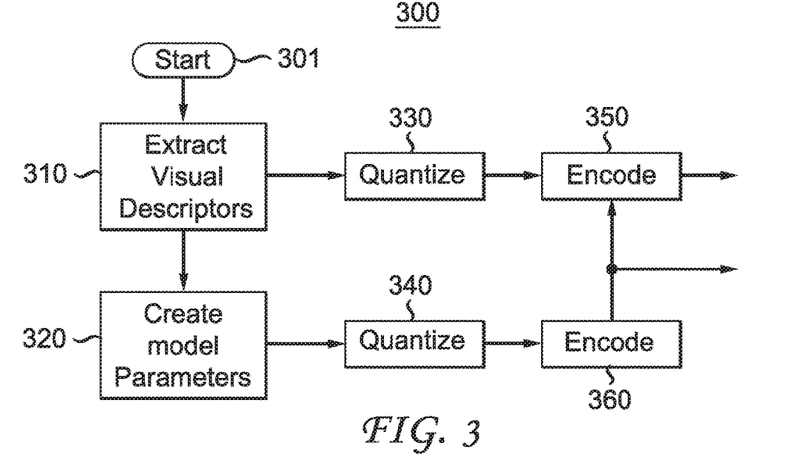
FIG. 3 shows an embodiment of an encoding method using the present principles.

FIG. 3 shows one embodiment of a method 300 for visual descriptors compression. The method commences at start block 301 and proceeds to block 310 for extracting visual descriptors from at least one image. The visual descriptors could, alternatively, have already been extracted and so block 310 can be for receiving such extracted visual descriptors. Control then proceeds to block 320 for creating model parameters of a generative probabilistic model from the extracted descriptors in the maximum likelihood sense. Control then proceeds to block 340 for quantizing the model parameters, followed by block 360 for encoding the quantized model parameters. In another control path, control proceeds from block 310 for receiving visual descriptors to block 330 for quantizing the visual descriptors, followed by block 350 for encoding the quantized visual descriptors using the encoded model parameters, which were the result of block 360.

Figure 4:
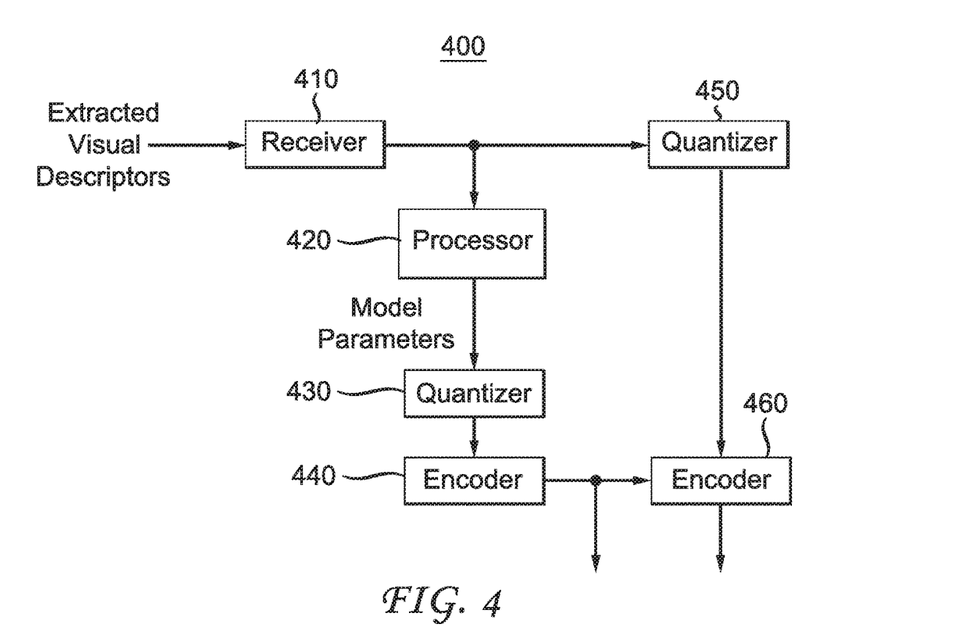
FIG. 4 shows an embodiment of an encoding apparatus using the present principles.

FIG. 4 shows one embodiment of an apparatus 400 for visual descriptors compression. The apparatus comprises a receiver 410 for extracted visual descriptors from at least one image. An output of receiver 410 is in signal communication with an input of processor 420 and also with an input of quantizer 450. Processor 420 is configured to determine model parameters of a generative probabilistic model from the extracted visual descriptors in the maximum likelihood sense. One possible generative probabilistic model is, for example, a Gaussian mixture model. Processor 420 has an output in signal communication with an input of quantizer 430 to produce quantized model parameters. An output of quantizer 430 is in signal communication with an input to encoder 440. Encoder 440 can be, for example, entropy encoded using Huffman encoding. Quantizer 450 receives as input the extracted visual descriptors on its input from receiver 410 and produces quantized visual descriptors on an output. An output of quantizer 450 is in signal communication with an input to encoder 460. Encoder 460 also receives as input the encoded model parameters from encoder 440. Encoders 440 and 460 may be implemented in the same or different encoder or piece of hardware or software. Encoder 460 uses a model-based arithmetic encoding to encode the visual descriptors using the model parameters. One such model-based arithmetic encoding can be, for example, a Gaussian mixture model encoding. Encoder 460 produced encoded visual descriptors on an output.

Figure 5:
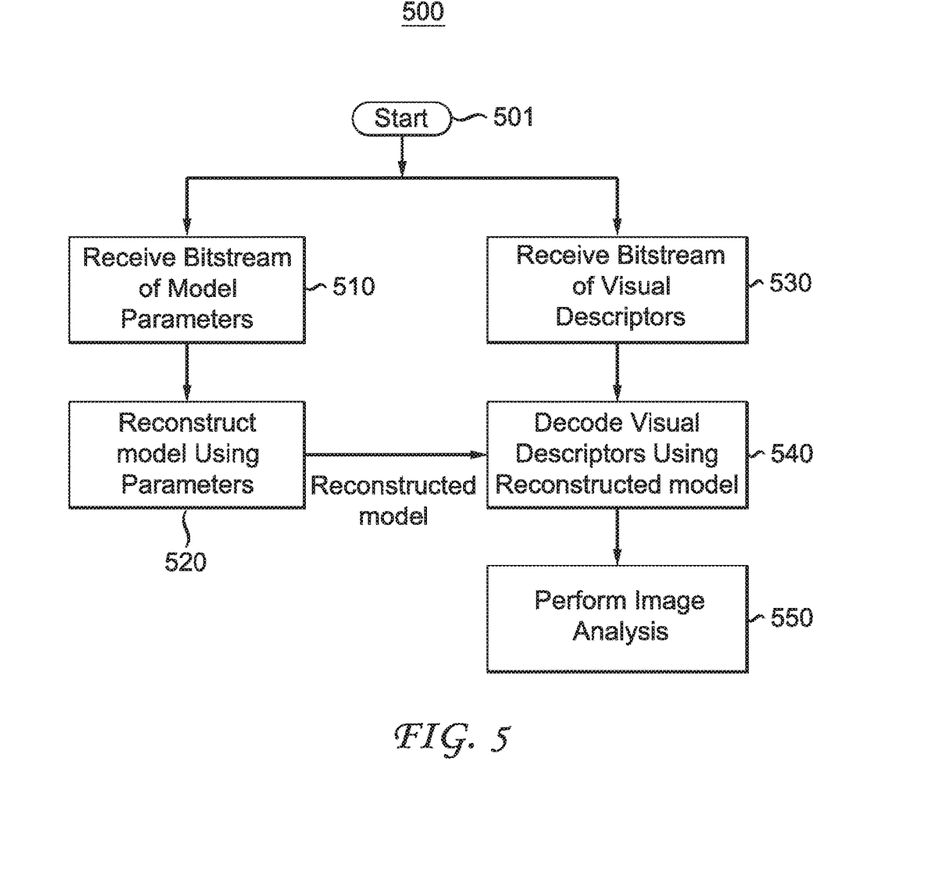
FIG. 5 shows an embodiment of a decoding method using the present principles.

FIG. 5 shows one embodiment of a method 500 for using the encoded visual descriptors. The method commences at start block 501 and proceeds to block 510 for receiving a bitstream of model parameters. Control then proceeds from block 510 to block 520 for reconstructing the model using the model parameters. Another control path starts proceeds from start block 501 to block 530 for receiving a bitstream of visual descriptors. This bitstream can be, for example, the same bitstream as that comprising the model parameters, or a separate bitstream. Also, either or both bitstreams, can be stored bitstreams, for example. Control proceeds from block 530 to block 540 for decoding visual descriptors using the reconstructed model generated in block 520. The model can be, for example, a Gaussian mixture model. Control proceeds from block 540 to block 550 for performing an image analysis. Image analysis can be, for example, image retrieval, object detection, or some other analysis task.

Figure 6:
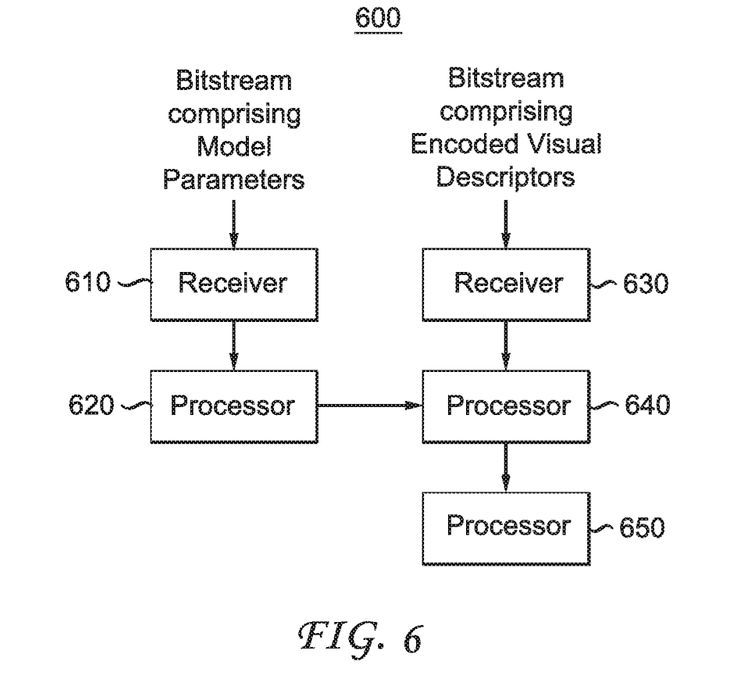
FIG. 6 shows an embodiment of a decoding apparatus using the present principles.

FIG. 6 shows one embodiment of an apparatus 600 using the encoded visual descriptors. The apparatus comprises a receiver 610 to receive a bitstream comprising model parameters of a generative probabilistic model on an input. An output of receiver 610 is in signal communication with an input of processor 620. Processor 620 reconstructs a generative probabilistic model using the model parameters from receiver 610. Apparatus 600 also comprises a receiver 630 that receives on an input a bitstream comprising encoded visual descriptors of at least one image. This bitstream can be the same, or a different, bitstream as that comprising the model parameters received by receiver 610, and receiver 610 and receiver 630 can be the same, or separate, receivers, for example. An output of receiver 630 is in signal communication with an input of processor 640. Processor 640 also takes as an input an output of processor 620, representing the reconstructed generative probabilistic model. Processor 640 decodes the encoded visual descriptors from receiver 630 using the reconstructed generative probabilistic model from processor 620 to produce visual descriptors on an output. This output from processor 640 is in signal communication with an input of processor 650 that performs an image analysis task using the decoded visual descriptors. Processors 620, 640, and 650 can be the same, or separate processors, or can be combined in any combination.

Figure 7:
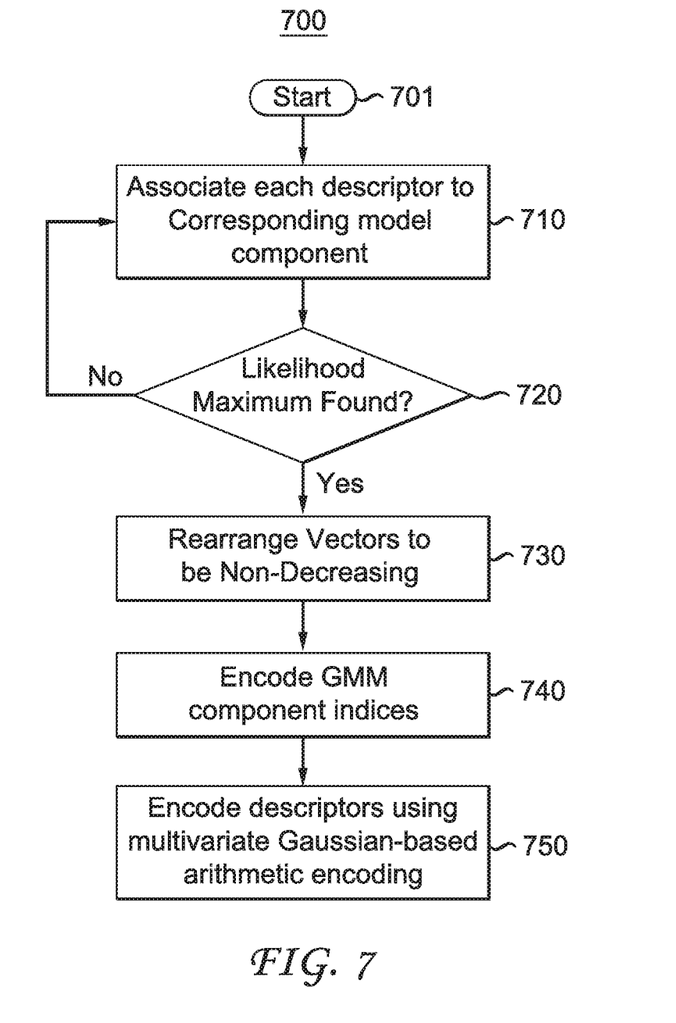
FIG. 7 shows another embodiment of an encoding portion of an apparatus using the present principles.

Another embodiment for encoding of the descriptors is shown in FIG. 7. The method commences at start block 701 and proceeds to block 710 for associating each vector to a generative probabilistic model, such as a corresponding Gaussian mixture model, component for which the likelihood of this vector is maximum. A particular GMM component represents a particular compression context under the aspects being described by the present principles.

Decision block 720 iterates checking for a maximum. After the maximum is found, control proceeds to block 730 for rearranging vectors in the order of GMM component indices to be non-decreasing. A rearrangement is possible within an image because the vectors include both descriptors and their coordinates, so the order is not important. This rearrangement leads to a better compression of GMM component indices.

Control then proceeds from block 730 to block 740 for encoding GMM component indices using any predictive entropy coding scheme. Control then proceeds from block 740 to block 750 for encoding each vector using a multivariate Gaussian-based arithmetic coding, corresponding to the selected GMM component.

A multivariate Gaussian-based arithmetic coding can be, for example, implemented as follows, relying on scalar quantization in the mean-removed Karhunen-Loeve transform (KLT) domain. Given a vector to be encoded and a selected Gaussian defined by its mean vector and its covariance matrix, the following steps need to be performed:

1. Apply the eigenvalue decomposition to the covariance matrix, thus representing it as an orthogonal matrix of eigenvectors (i.e., the KLT) and a diagonal matrix of eigenvalues.
2. Subtract the mean from the vector to be encoded.
3. Decorrelate the vector by applying the KLT.
4. Quantize each component (i.e., each vector dimension) of the resulting vector using a uniform scalar quantizer and encode the corresponding indices using an arithmetic coder relying on the corresponding Gaussian distribution (i.e., zero-mean Gaussian distribution with variance being the eigenvalue corresponding to the encoded component (vector dimension)).

The aforementioned methods have several potential advantages. Due to better exploitation of redundancy of the natural image descriptors, an improvement in the distortion should be evident. In addition, arithmetic entropy coding offers improvement in numerical efficiency at the decoder because, if there is a need to pre-train a global probabilistic model, it can only be required at the encoder.

The aforementioned methods applied to video are not based on any intra-frame prediction, although redundancy between frames in video may still be exploited if a global model is learned from several frames of one shot. Thus, the methods allow efficient decoding of descriptors of any frame without a need for reconstructing descriptors of previous frames. In the case of videos, it is possible to extend this scheme so that intra-frame prediction is exploited. This would lead to smaller compression rates at the expense of slightly higher computational complexity.

The aforementioned methods can be based on a probabilistic model, such as the Gaussian mixture model, as one of the methods used for aggregation to produce, for example, Bag of visual Words (BoWs) or Fisher vectors. Therefore, the same probabilistic model can be used for both the compression and the aggregation steps. As such, a possible extension of the proposed scheme would be a scheme where the compression and the aggregation are performed relying on the same model, which could lead to greater efficiency in terms of both the computational and rate savings.

The present description illustrates the present principles. It will thus be appreciated that those skilled in the art will be able to devise various arrangements that, although not explicitly described or shown herein, embody the present principles and are thereby included within the present principles.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, and random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications may be effected therein by one of ordinary skill in the pertinent art without departing from the scope of the present principles. All such changes and modifications are intended to be included within the scope of the present principles as set forth in the appended claims.

The invention claimed is:

1. A method of compressing visual descriptors from at least one image by exploiting redundancy of natural image descriptors, comprising:
    extracting the visual descriptors from at least one image, said visual descriptors describing key points in images;
    creating model parameters of a generative probabilistic model from the extracted visual descriptors in a maximum likelihood sense;
    quantizing and encoding said model parameters;
    quantizing said extracted visual descriptors; and,
    applying a model-based arithmetic encoding to said quantized extracted visual descriptors using said encoded model parameters exploiting redundancy of the visual descriptors within the at least one image for compression of the visual descriptors.

2. The method of claim 1, comprising storing at least one of said encoded model parameters and said encoded visual descriptors.

3. The method of claim 1, comprising transmitting at least one of said encoded model parameters and said encoded visual descriptors to a decoder.

4. The method of claim 1, said encoding of said quantized extracted visual descriptors comprising:
- associating each said visual descriptor with a corresponding Gaussian mixture model component for which the likelihood of said visual descriptor is maximum;
- rearranging said visual descriptors by order of Gaussian mixture model component indices so that the visual descriptors are non-decreasing;
- encoding Gaussian mixture model component indices using a predictive entropy coding scheme; and
- encoding each said visual descriptor using a multivariate Gaussian-based arithmetic coding.

5. The method of claim 1, wherein the generative probabilistic model is a Gaussian mixture model.

6. An apparatus for compressing visual descriptors from at least one image by exploiting redundancy of natural image descriptors, comprising:
- a receiver of visual descriptors extracted from at least one image, said visual descriptors describing key points in images;
- a processor, configured to determine model parameters of a generative probabilistic model from the extracted visual descriptors in a maximum likelihood sense;
- a quantizer of said model parameters;
- an encoder of said quantized model parameters;
- a quantizer of said extracted visual descriptors; and
- an encoder for encoding said quantized extracted visual descriptors using said model parameters by applying a model based arithmetic encoding to exploit redundancy of the visual descriptors within the at least one image for compression of the visual descriptors.

7. The apparatus of claim 6, wherein at least one output of the model parameters and encoded visual descriptors encoders are stored.

8. The apparatus of claim 6, wherein at least one output of the model parameters and encoded visual descriptors encoders are transmitted to a decoder.

9. The apparatus of claim 6, said encoder of said quantized extracted visual descriptors comprising:
- a processor that associates each visual descriptor with a corresponding Gaussian mixture model component for which the likelihood of said visual descriptor is maximum;
- a second processor that rearranges visual descriptors by order of Gaussian mixture model component indices so that the visual descriptors are non-decreasing;
- an encoder of Gaussian mixture model component indices that uses a predictive entropy coding scheme; and
- an encoder of each visual descriptor using a multivariate Gaussian-based arithmetic coding.

10. The apparatus of claim 6, wherein the generative probabilistic model is a Gaussian mixture model.

11. A method of decoding compressed encoded visual descriptors from at least one image, comprising:
- receiving a bit stream comprising quantized generative probabilistic model parameters determined from visual descriptors extracted from the at least one image in a maximum likelihood sense;
- reconstructing a generative probabilistic model using said quantized generative probabilistic model parameters;
- receiving a bit stream comprising the compressed encoded visual descriptors, the compressed encoded visual descriptors describing key points in the at least one image;
- decoding said compressed encoded visual descriptors using said reconstructed generative probabilistic model thereby exploiting redundancy of the compressed encoded visual descriptors within the at least one image; and,
- performing an image analysis using said decoded visual descriptors.

12. The method of claim 11, wherein the generative probabilistic model is a Gaussian mixture model.

13. An apparatus for decoding compressed encoded visual descriptors from at least one image, comprising:
- a receiver of a bit stream comprising quantized generative probabilistic model parameters determined from visual descriptors extracted from the at least one image in a maximum likelihood sense;
- a processor to reconstruct a generative probabilistic model using said quantized generative probabilistic model parameters;
- a receiver of a bit stream comprising the compressed encoded visual descriptors, the compressed encoded visual descriptors describing key points in the at least one image;
- a processor to decode the compressed encoded visual descriptors using said reconstructed generative probabilistic model thereby exploiting redundancy of the compressed encoded visual descriptors within the at least one image; and,
- a processor to perform image analysis using said decoded visual descriptors.

14. The apparatus of claim 13, wherein the generative probabilistic model is a Gaussian mixture model.

* * * * *